Figure 4:
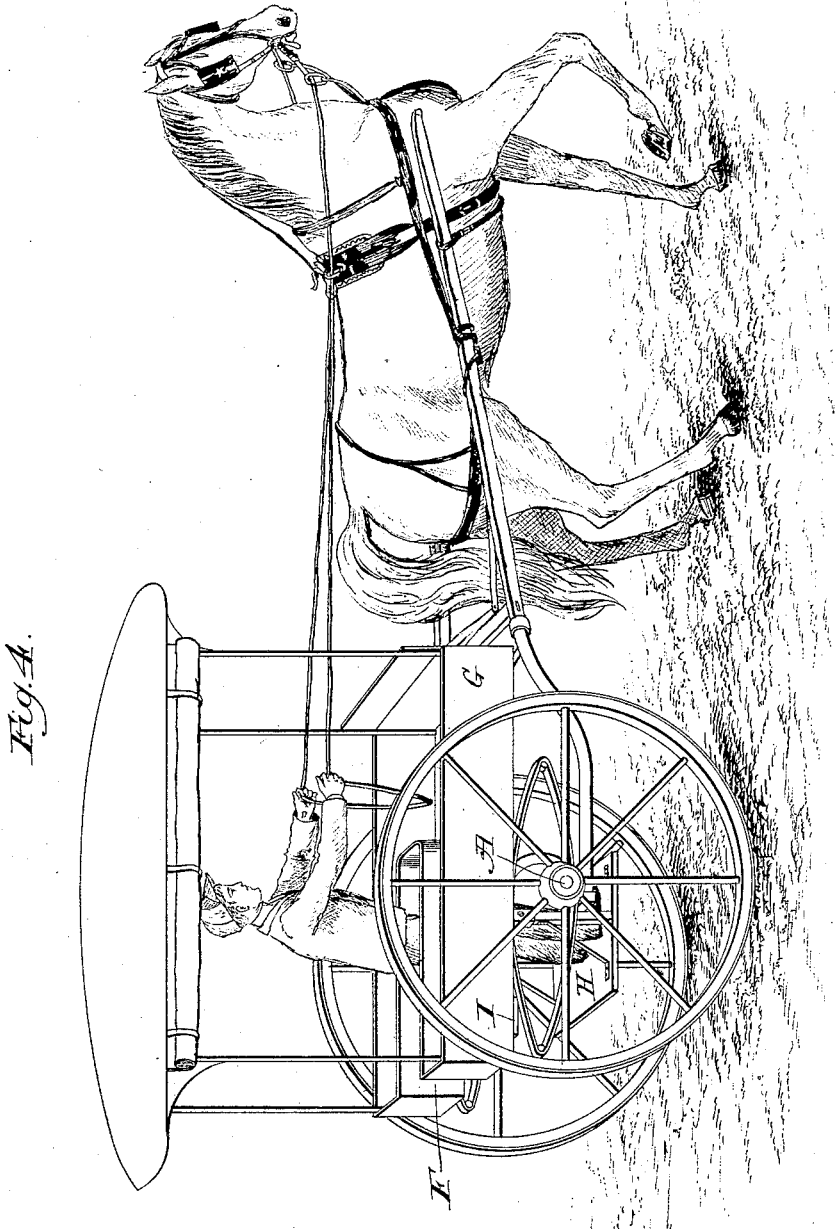

(No Model.) 2 Sheets—Sheet 1.

W. H. MORLOCK & R. A. HAEGELIN.
TWO WHEELED VEHICLE.

No. 385,720. Patented July 10, 1888.

Witnesses:
Geo. W. Hinton.
O. L. Bower.

Inventor,
Wm. H. Morlock.
Richard A. Haegelin.

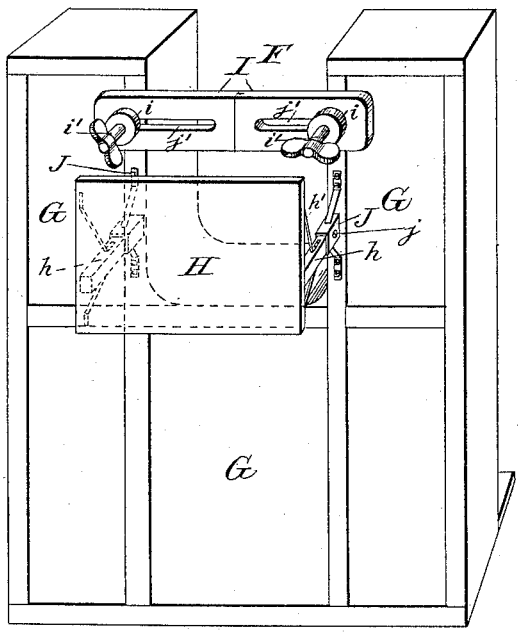

United States Patent Office.

WILLIAM H. MORLOCK AND RICHARD A. HAEGELIN, OF ST. JOSEPH, MISSOURI.

TWO-WHEELED VEHICLE.

SPECIFICATION forming part of Letters Patent No. 385,720, dated July 10, 1888.

Application filed January 23, 1888. Serial No. 261,690. (No model.)

*To all whom it may concern:*

Be it known that we, WILLIAM H. MORLOCK and RICHARD A. HAEGELIN, citizens of the United States, and residents of St. Joseph, in the county of Buchanan and State of Missouri, have invented certain new and useful Improvements in Two-Wheeled Vehicles or Carts; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to two-wheeled vehicles which are specially intended for use as delivery-carts; and it consists in the novel construction and combination of the parts hereinafter fully described and claimed, whereby the driver may step into or out of the cart with great facility, and drive either in a sitting or standing posture under the shelter of the top, and without experiencing any of the jerking motion usual in driving a two-wheeled vehicle.

In the drawings, Figure 1 is a rear view of the axle. Fig. 2 is a plan view of the axle from above. Fig. 3 is a perspective view of the bottom of the vehicle-body, showing the attachment of the adjustable platform upon which the driver stands and the seat. Fig. 4 is a perspective side view of the vehicle when in use.

G is the body of the vehicle, which is provided with a top or canopy to keep off the sun and rain, and with shafts, road-wheels, and side springs of any approved construction. The body is a plain rectangular frame-work of wood, and is provided with the opening F for the body of the driver.

A are the ends of the axle upon which the road-wheels are journaled, and the said axle is provided with the downwardly-bent cranks B in the ordinary manner. The axle is not, however, made straight between the cranks B, but is cranked or bent forward from the points C C, preferably forming the plain curved bend C'.

H is an adjustable platform, suspended beneath the opening F in the body of the vehicle, for the driver to stand on while driving. The said opening has its open end at the rear of the vehicle, and it extends forward beyond the center of the wheels. The central forwardly-cranked portion, C', is provided in the axle, so that the driver may bring the weight of his body over the center line of the wheels, or in such position relative thereto that the whole weight of the loaded vehicle may be balanced upon the ends of the axle. It will be seen that as the weight of the driver comes upon the platform below the axle the center of gravity of the loaded vehicle is kept very low, and that the motion of the animal will not impart a forward jerking movement to the vehicle-body, as would be the case if the weight of the driver were supported at a point above the level of the springs. The driving-platform H is provided with arms $h$, supported by the braces $h'$, and J are brackets bolted to the under side of the body of the vehicle. The platform is adjusted vertically by sliding the arms in the brackets, and each bracket is provided with a screw, $j$, for holding the arm in the bracket after the platform has been adjusted to suit the height of the driver.

I is a seat upon which the driver may rest himself occasionally. This seat is supported upon the collars $i$ of the screws $i'$, which engage with the body, and by means of which the height of the seat above the platform may be regulated. The seat is hinged or pivoted in such a manner that the driver may turn it out of the way very easily before stepping into or out of the vehicle.

In Fig. 3 of the drawings the seat is shown in two parts, each of which is provided with a slot, $j'$, which permits the halves of the seat to be swung around.

It will be seen that whether standing or sitting the driver is always under the shelter of the top or canopy, and that he can step into or out of the vehicle with very little exertion.

What we claim is—

1. In a delivery-cart, the combination, with the body, consisting of a plain rectangular frame provided with a rearward opening extending vertically clear through it for the body of the driver, of a driving-platform suspended under the said opening for the driver to stand on.

2. In a delivery-cart, the combination, with the body, consisting of a plain rectangular frame provided with a rearward opening extending vertically clear through it to a point beyond the center of the wheels, of a platform for the driver suspended under the said opening, and an axle provided with a central cranked portion to clear the body of the driver.

3. In a delivery-cart, the combination, with the body provided with the rearward opening, of the axle provided with downwardly-bent cranks at each end and a forwardly-cranked portion in the center to clear the body of the driver.

4. In a delivery-cart, the combination, with the body provided with a rearward opening, of a vertically-adjustable platform for the driver suspended under the said opening.

5. In a delivery-cart, the combination, with the body, consisting of a plain rectangular frame provided with a rearward opening extending vertically clear through it, of a platform suspended under the said opening for the driver to stand on, and a movable seat pivoted to the body at the rear of the opening.

6. In a delivery-cart, the combination, with the body provided with a rearward opening, of the brackets secured under the body, the platform for the driver provided with arms sliding vertically in said brackets, and screws for securing the arms in the brackets after the height of the platform has been adjusted.

In testimony whereof we affix our signatures in presence of two witnesses.

WM. H. MORLOCK.
RICHARD A. HAEGELIN.

Witnesses:
GEO. W. HINTON,
THOMAS KERRIGAN.